United States Patent
Senf et al.

(10) Patent No.: US 12,255,300 B2
(45) Date of Patent: Mar. 18, 2025

(54) PLATE-LIKE FLUID CONTAINER AND BATTERY TEMPERATURE-CONTROL ASSEMBLY

(71) Applicant: Reinz-Dichtungs-GmbH, Neu-Ulm (DE)

(72) Inventors: Felix Senf, Ulm (DE); Harald Rebien, Neu-Ulm (DE); Juergen Schneider, Merklingen (DE); Joachim Schnurrenberger, Leutkirch (DE); Christian Luksch, Illertissen (DE); Gareth D. G. Graves, Mississauga (CA)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 987 days.

(21) Appl. No.: 17/288,499

(22) PCT Filed: Oct. 25, 2019

(86) PCT No.: PCT/EP2019/079205
§ 371 (c)(1),
(2) Date: Apr. 23, 2021

(87) PCT Pub. No.: WO2020/084120
PCT Pub. Date: Apr. 30, 2020

(65) Prior Publication Data
US 2021/0391608 A1   Dec. 16, 2021

(30) Foreign Application Priority Data
Oct. 25, 2018 (DE) .......................... 202018004979.4

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/625* (2015.04);
(Continued)

(58) Field of Classification Search
CPC ........... H01M 10/6556; H01M 10/613; H01M 10/625; H01M 10/63; H01M 10/6554;
(Continued)

(56) References Cited

U.S. PATENT DOCUMENTS

2016/0036104 A1   2/2016  Kenney et al.
2020/0025465 A1*  1/2020  Kim ........................ F28F 3/083

FOREIGN PATENT DOCUMENTS

DE   102017202552 A1   8/2018
WO   WO-2013037742 A1 *  3/2013 .......... H01M 10/613

OTHER PUBLICATIONS

ISA European Patent Office, International Search Report Issued in Application No. PCT/EP2019/079205, Jan. 9, 2020, WIPO, 4 pages.

* cited by examiner

*Primary Examiner* — Kaity V Chandler
(74) *Attorney, Agent, or Firm* — McCoy Russell LLP

(57) ABSTRACT

The present disclosure relates to a plate-like fluid container for the temperature control of an accumulator device for electrical energy or of an electrical consumer, for example in a motor vehicle, having two layers contacting one another at least regionally, an inlet for pouring a fluid into the fluid container, an outlet for discharging the fluid from the fluid container, and a fluid channel system arranged between the layers that connects the inlet to the outlet and is configured to be flowed through by the fluid during the temperature control, wherein a spacing of at least two first channel sections of the fluid channel system extending parallel to one another is larger in a first region of the fluid channel system disposed upstream than a spacing of at least two second (Continued)

(A-A)

channel sections of the fluid channel system extending parallel to one another in a second region of the fluid channel system disposed downstream to improve the temperature control performance of plate-like fluid containers for temperature control.

17 Claims, 8 Drawing Sheets

(51) Int. Cl.
    *H01M 10/625*     (2014.01)
    *H01M 10/63*     (2014.01)
    *H01M 10/6554*     (2014.01)
    *H01M 10/6568*     (2014.01)

(52) U.S. Cl.
    CPC ....... *H01M 10/63* (2015.04); *H01M 10/6554* (2015.04); *H01M 10/6568* (2015.04); *H01M 2220/20* (2013.01)

(58) Field of Classification Search
    CPC ......... H01M 10/6568; H01M 2220/20; H01M 6/5038; H01M 10/6552; H01M 10/6567; H01M 10/617; H01M 8/04029; Y02E 60/10; Y02E 60/50
    See application file for complete search history.

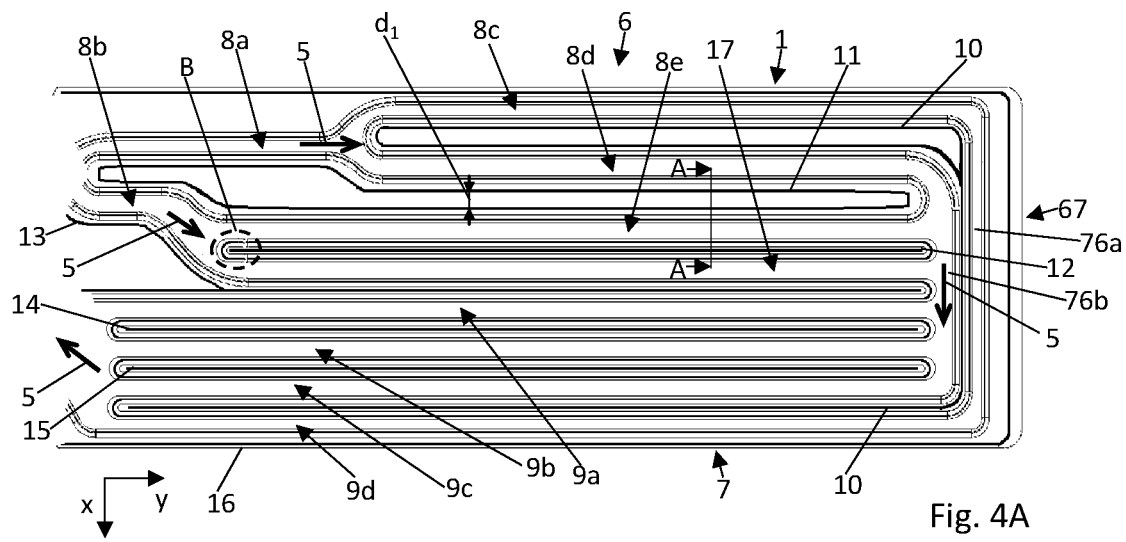
Fig. 4A
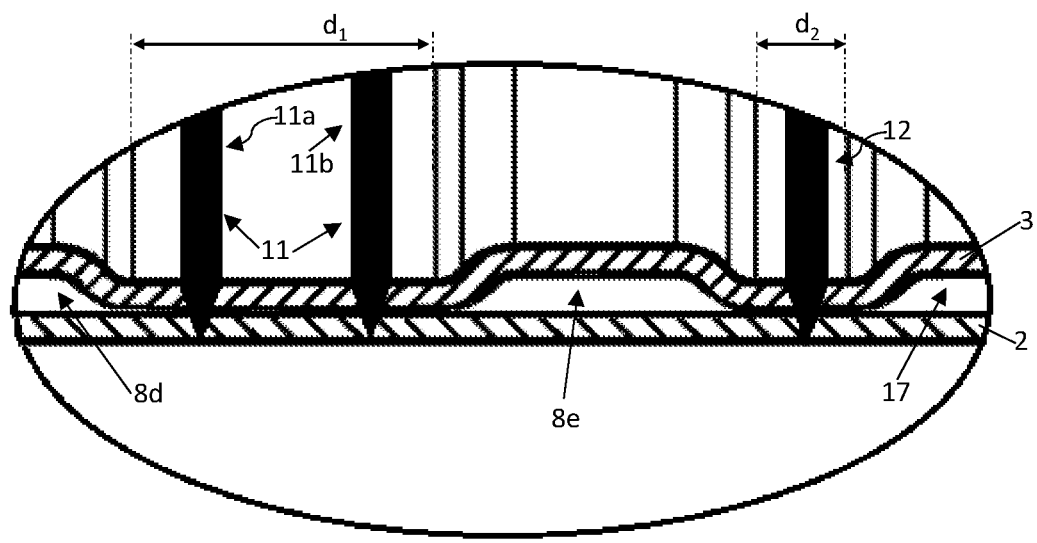
Fig. 4B (A-A)
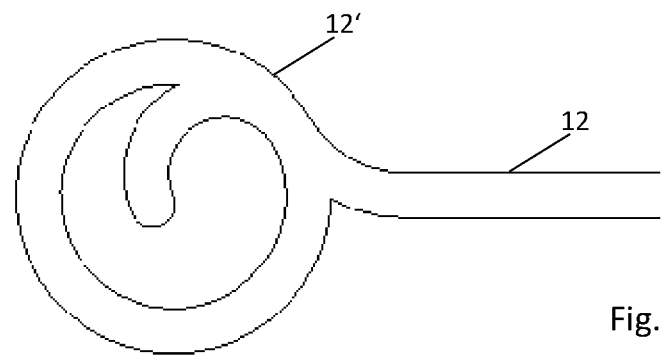
Fig. 4C (Detail B)

PLATE-LIKE FLUID CONTAINER AND BATTERY TEMPERATURE-CONTROL ASSEMBLY

CROSS-REFERENCE TO RELATED APPLICATIONS

The present application is a U.S. National Phase of International Patent Application Serial No. PCT/EP2019/079205, entitled "PLATE-TYPE FLUID CONTAINER AND BATTERY TEMPERATURE-CONTROL ASSEMBLY," and filed on Oct. 25, 2019. International Patent Application Serial No. PCT/EP2019/079205 claims priority to German Utility Model Application No. 20 2018 004 979.4, filed on Oct. 25, 2018. The entire contents of each of the above-mentioned applications are hereby incorporated by reference in their entirety for all purposes.

TECHNICAL FIELD

The invention relates to a plate-like fluid container for conducting a fluid, in particular for the temperature control of an electrochemical system such as an accumulator device for electrical energy or an electrical consumer, the plate-like fluid container having two layers that contact one another at least regionally, an inlet for pouring a fluid into the fluid container, an outlet for discharging the fluid from the fluid container, and a fluid channel system that is arranged between the layers, that connects the inlet to the outlet, and that is configured to be flowed through by the fluid during the temperature control, that is a cooling and/or heating. The filling and discharging in this context may be a continuous inflow and outflow in most operating states. The invention furthermore relates to a corresponding battery temperature control assembly that comprises such a plate-like fluid container. The plate-like fluid container in accordance with the invention can be used, for example, for cooling and/or heating batteries in a hybrid or electric vehicle.

BACKGROUND AND SUMMARY

It is generally known to use cooling plates for cooling, but also for heating, and thus generally for establishing the temperature control of a component of metals or also plastics adjacent to the cooling plate. For this purpose, for example, two metal plates, of which at least one has channel structures, can be soldered or welded to one another while forming the cooler plate. A hollow space through which a fluid can be conducted for cooling is produced between the two metal plates in this process by the topography of the channel structures that are designed in the form of one or more recesses in one or both of the plates. Such cooling or temperature control plates can generally also be called plate-like fluid containers for temperature control. DE 10 2017 202 552 A1, for example, discloses such a cooling plate that can also be called a plate-like fluid container for a temperature control.

It is now the underlying object of the invention to improve the temperature control performance of known cooling and/or heating plates, that is of known plate-like fluid containers for temperature control, in particular to achieve a more uniform temperature control performance.

One aspect relates to a plate-like fluid container for temperature control, that is for heating or cooling, in particular for the temperature control of an accumulator device for electrical energy or of an electrical consumer. The accumulator device or the electrical consumer may be part of a vehicle, for example of a motor vehicle having an electric drive motor. "Plate-like" can here be understood such that the fluid container extends in a main plane of extent with a predefined length and width and the thickness of the fluid container perpendicular to the main plane of extent is smaller than the length and/or width by a multiple, for example at least by a factor of 10 or at least by a factor of 50 or at least by a factor of 200. Such a plate-like fluid container for temperature control can also be called a temperature control plate and/or a cooling plate and/or a heating plate.

The fluid container here has two layers, for example metal layers, possibly also plastic layers, that contact one another at least regionally, as well as an inlet for pouring a fluid into the fluid container, an outlet for discharging the fluid from the fluid container, and a fluid channel system that is arranged between the layers, that connects the inlet to the outlet in the sense of a fluidic coupling, and that is configured to be flowed through by the fluid in a flow direction from the inlet to the outlet during the temperature control.

In this respect, a first spacing of at least two, possibly also three or more first channel sections of the fluid channel system extending parallel to one another is larger in a first region of the fluid channel system disposed upstream than a second spacing of at least two, possibly three or more second channel sections of the fluid channel system extending parallel to one another in a second region of the fluid channel system disposed downstream. The first spacing can therefore be larger, but the second spacing smaller, than a predefined value of, for example, 2 cm. It must be noted that both straight-line channel sections can extend in parallel and non-straight line channel systems, for example the channel sections extending in parallel can therefore also have the form of parallel wave lines, as shown in even more detail in FIG. 8. Within the framework of the present disclosure, substantially parallel channel sections that extend in parallel up to a predefined maximum deviation of, for example, 2° or 7° or 15° can also be called parallel. Within the framework of the present disclosure, channel sections can also be called substantially parallel that extend in parallel on average (also parallel in the sense of the preceding sentence), that is for which an averaged extent is parallel, as long as the width of the area taken up by the channel section is not wider than 1.5 times, or not wider than 1.25 times, of the maximum spacing between two oppositely disposed base points of the channel section on a connection line that extends perpendicular to a center line of the channel section. The averaged extent, also called the center line, can be determined, for example, by a straight line extending from a start point of the respective channel section to an end point, or also via an averaging over the direction vectors of the channel section over its length. Channel sections having only a few proliferating sinuous lines or having an occasionally and/or slightly pronounced wave shape can thus also extend in parallel in the sense of the present disclosure. The averaged extent of respective channel sections or the center line of the channel section can also be used for the determination of other relative orientations, for example the angle named further below between channel sections in the different regions. The parts of the fluid channel system designated as extending parallel to one another here may be exclusively straight-line, that is the channel sections are straight line channel sections. These straight line channel sections can, however, merge into one another or be fluidically coupled with one another via curved part sections, for example.

The terms "upstream" and "downstream" can here be understood with respect to the direction of flow or throughflow direction in the sense of customary language that is known from flows. Independently of possible curves and/or branches in the fluid channel system, the fluid can therefore first flow through the first region of the fluid channel system disposed upstream and from there through the second region of the fluid channel system disposed downstream on the flowing of liquid through the fluid channel system from the inlet to the outlet. Different regions can also be arranged between the two regions; the fluid can therefore flow from the first region into a different region and from there into the second region.

The variation of the spacings has the advantage that the cooling or heating power, that is the temperature control performance, of the fluid container, is homogenized during operation, that is the cooling or heating power in the first region and in the second region are approximated to one another. This is due to the fact that the temperature of the fluid at the inlet of the fluid container and thus upstream typically deviates more from a target temperature value of the component to be temperature controlled, that is, for example, the accumulator device or the electrical consumer, than downstream. While it is customary not to distinguish between the first and second regions in the prior art, i.e. to provide the same spacings between the parallel channel sections distributed over the total fluid container, spacings between the first channel sections are deliberately used here that are increased with respect to the spacings between the second channel sections. The heat transfer over this increased spacing of the first channel sections from one another is therefore reduced in the first region disposed upstream in comparison with the use of the same spacing in the first and second regions of the fluid channel system.

A geometrical parameter such as a cross-section or at least a width of the respective channel sections of the fluid channel system in the different region can, for example, be the same due to the variation of the spacing between the channel sections, that is, for example, a production parameter with respect to the shaping behavior and/or other production parameters and/or a parameter optimized to a pressure drop and/or to other hydrodynamic properties such as the channel width can remain identical and the different temperature of the fluid upstream and downstream can nevertheless be compensated within the fluid channel system. This solution is also particularly simple and thus advantageous in a technical production aspect.

It is also in particular possible by the variation of the spacing of the channel sections to optimally position the channel sections while maintaining the aforesaid properties thereof, for example with respect to the outer edges of the fluid container, which is mostly not possible with a rigid spacing pattern without any adaptation of the properties, in particular of the channel width. If the optimized parameters are to be maintained, only whole number multiples of the unit dimension resulting for the channel width plus the spacing in the typical assembly with optimized parameters can be selected as the width or length of the cooling plate or the cooling plate has a margin impairing the temperature control function.

The respective channel sections that extend parallel to one another and that can respectively be the first channel sections and/or the second channel sections may be configured to conduct partial flows of the fluid that flow (in a directed manner) in parallel. The first channel sections or the second channel sections or the first and second channel sections can therefore each be configured to conduct part flows of the fluid flowing in parallel. The throughflow direction of the first channel sections, on the one hand, and of the second channel sections, on the other hand, that can be seen from the design of the fluid channel system as a whole is then oriented the same in the channel sections extending parallel to one another. Since they are configured for a conducting of respective part flows of the fluid, the channel sections extending parallel to one another are fluidically coupled, analog to an electrical parallel circuit, upstream, i.e. between the inlet and the region of the parallel extent, via a fork that divides an original flow of the fluid into the part fluids. The local relative throughflow speeds of the fluid through the fluid container can thereby be set in a simple manner with high mechanical stability, in particular without windings that are disadvantageous in a technical flow aspect.

The channel sections respectively extending parallel to one another are here in particular respective nearest neighbors, that is channel sections that are disposed nearest to one another. No further channel sections, for example no channel sections having an oppositely oriented throughflow direction, are thus located between said channel sections extending parallel to one another. In this respect, channel sections disposed nearest to one another can be merged into one another again downstream, that is the part flows can be combined again. An island is thereby formed in the fluid channel system that is flowed around in the same direction by the fluid at the sides formed by the channel sections extending parallel to one another. Such an island results in increased stability and flexible design options in particular with the welding of the layers described further below.

Unlike the known dimples, that is welded points, such an island can have a size independent of the dimension of the weld seam. The respective island can thus, for example, have a minimum width of 50% of a channel width of one of the channels around the island. The channel width and the island width are here measured as the spacing of the weld seams configuring the channel sections extending in parallel or configuring the island, and indeed perpendicular to the throughflow direction in the channel sections extending in parallel or perpendicular to the center line of the channel sections extending in parallel. A length of the respective island extending perpendicular to the width can, for example, amount to at least three times, or at least five times, the channel width of the channel sections extending in parallel and adjacent to the island.

In an advantageous embodiment, the first channel sections extend parallel to the second channel sections, but are flowed through in an antiparallel, i.e. oppositely oriented, direction of flow. It is advantageous in this respect if a reversal region is arranged between the first region disposed upstream and the second region disposed downstream, said reversal direction having at least one, that is one or more, further channel sections that each fluidically couples one or more of the first channel sections with a respective one or more of the second channel sections. A large part of the at least one further channel section adjoining the first channel sections downstream here in particular extends at an angle between 80° and 100° to the first channel sections and a large part of the at least one further channel section adjoining the second channel sections upstream extends at an angle between 80° and 100° to the second channel sections. A large part can here in particular mean at least 60%, at least 70%, or at least 80%.

The reversal region can be the smallest region to which it applies that the mean direction of flow for all the temperature control fluid flowing in it, that is at a channel cross-section at an end of the region disposed upstream, is oriented opposite or substantially opposite the mean direction of flow for all the tempering control fluid flowing out of it, that is, is oriented at a channel cross-section at the end of the region disposed downstream. The mean direction of flow can designate the (temporally and/or spatially) averaged direction of flow over all the fluid particles in a channel cross-section. The throughflow direction of a channel section, in contrast, can also be designated a (temporally and/or spatially) averaged direction of flow of all the fluid particles in the channel section.

In a particularly advantageous manner, the reversal region here that at least two further channel sections that each fluidically couple a respective at least one first channel section with at least one second channel section independently of one another. The first channel sections opening into the different further channel sections of the reversal region therefore differ from one another, like the second channel sections being fed from the different further channel sections also differ from one another.

The at least two further channel sections can here extend directly next to one another, that is without any other channel section between them. Provision can also be made that the reversal region has at least one further channel section that is to be called non-mixing and that fluidically couples exactly one first channel section with exactly one second channel section and/or at least one further channel section that is to be called mixing and that fluidically couples a plurality of different channel sections with at least one second channel section or a plurality of second channel sections with at least one first channel section.

Provision is made in another advantageous embodiment that the first channel sections extend parallel to the second channel sections and are flowed through in a parallel, that is similarly oriented, direction of flow. Changes of direction of the fluid flow are hereby very largely avoided and the pressure loss is kept to a minimum so that the energy effort for the temperature control is small.

Provision is made in a further advantageous embodiment that the channel sections of the fluid channel system extending parallel to one another each extend in a straight line over at least 40% or at least 50% or at least 60% or at least 70% or at least 80% or at least 85% or at least 90% of the length or width of the fluid container. This has the advantage that the temperature control performance can thus also be homogenized and so improved with small planning and technical production effort over larger area portions and over larger fluid containers.

Provision is made in another advantageous embodiment that the fluid channel system branches into at least two fluid channel part systems that, like the described fluid channel system, each have a plurality of first channel sections of a first region of the respective fluid channel part system disposed downstream extending parallel to one another and a plurality of second channel sections of a second region of the fluid channel part system disposed downstream extending parallel to one another. A spacing of the first channel sections from one another in the respective fluid channel part system is here also larger than a spacing of the second channel section. A fluid that flows through the fluid container from the inlet to the outlet can in this case in particular flow either through one of the at least two fluid channel part systems or through another one of the at least two fluid channel part systems, but not through both fluid channel part systems. A parallel flowing through of the first and second channel sections or an antiparallel flowing through of first and second channel sections within a fluid channel path system is also possible here, with it being advantageous in the latter case for each fluid channel part system in which the throughflow is in the direction of flow in the first channel sections and is in the antiparallel direction of flow in the second channel sections to have a reversal region. The channel sections of the fluid channel part system that extend parallel to one another within at least one of the at least two fluid channel system parts here preferably each extend in a straight line over at least 20% or at least 30% or at least 35% or at least 40% or at least 42.5% of the length or width of the fluid container.

The use of a plurality of fluid channel part systems has the advantage that the inlet and outlet can be positioned particularly flexibly on the fluid container and that nevertheless a homogeneous temperature control performance can be achieved for a large number of different formats of the fluid container. This is also achieved with a small production effort as in the other variants described. It is also possible in this context that exactly two fluid channel part systems are implemented in the fluid container and are arranged with mirror symmetry to one another and/or to the inlet and/or to the outlet.

Provision is made in a further advantageous embodiment that a channel width is substantially the same in the first and second channel sections. "Substantially the same" can here be understood as "the same except for a predefined deviation", with the deviation being able to amount, for example, to at most 15%, at most 10%, or at most 7%. The channel width designates the extent of the respective channel section in the main plane of extent of the fluid container perpendicular to the throughflow direction of the fluid. The channel width can in particular be between five and sixty times as large, for example ten times as large, as a channel height that is perpendicular to the main plane of extent (and to the channel width).

This has the advantage that the improved temperature control performance can be combined with an optimum channel width of the fluid container. The optimum channel width can here be predefined in dependence on the operating parameters and on the properties of the layers of the fluid container, in particular of the material used for the layers or the layer thickness. The shape of the channels in the fluid channel system or in the channel sections can here also have an influence on the optimum channel width. It can thus be achieved overall that a target parameter, for example a pressure drop, can be optimized in the respective channel sections, minimized in the case of a pressure drop.

Provision is made in a particularly preferred embodiment that the spacing of the first channel sections from one another is larger than half the channel width of the first or second or both channel sections and/or that the spacing of the second channel sections from one another is smaller than half the channel width of the first or second or both channel sections. The indicated range has been found to be particularly advantageous for the homogenized temperature control performance here.

Provision is made in a further, particularly advantageous embodiment that the two layers between the first channel sections that are each nearest neighbors, are welded together by two weld seams and the two layers between the second channel sections that are each nearest neighbors are in particular welded together by only one weld seam. The two weld seams can here, for example, merge outside an area that is located between the two first channel sections that are nearest neighbors and then forms one of the above-named islands. On a global observation, the two weld seams can also be considered in certain cases as two weld seams of a double weld seam that belong to one another and that cannot completely terminate an area. It is, however, decisive that two weld seams are present in a cross-section perpendicular to the throughflow directions through the channel section between the first channel sections that are each nearest neighbors and only one weld seam between the second channel sections that are each nearest neighbors.

The spacing between two weld seams that are associated with an island, that Is are arranged between two channel sections that are nearest, is in particular not larger than the widest of these adjacent channel sections. This has the advantage that the associated weld seams that as internal weld seams do not necessarily serve the sealing of the fluid channel system toward the outside, do not have to be leak tight, and are nevertheless stable enough to suppress an arching, for example.

If the two weld seams that are arranged between two channel sections that are nearest are leak tight, they form a section, an island, in which no fluid penetrates. A fastening point such as a bore can be arranged in such a section, for example.

The temperature control behavior can be further adapted via the section between the two weld seam that belong together, for example a corresponding island. On the one hand, the two layers can contact one another over a large area in such a section and can thus enable a temperature exchange in interaction with the environment. On the other hand, a spacing can be directly provided in such a section between the two layers so that an insulator is formed such that the respective section does not have any active temperature control effect.

A simple seam admittedly generally has a space requirement that is smaller by a factor of 1.3 to 2 than a narrow double weld seam, but it restricts the variability of the spacing of two channels disposed nearest one another. This is also due to stability demands that forbid the spacing between the weld seam and the channel side wall from being larger than a predefined maximum dimension.

The spacing of two weld lines directly bounding a channel section, that is optionally also of a single seam or a double seam directly bounding the channel section, typically amounts to a maximum of 20 to 40 times the material thickness of a layer when the two layers have the same material thickness. If, however, the layers have different material thicknesses, it is a little smaller and amounts to a maximum of 15 to 30 times the mean material thickness. However, the specific values depend very much on the other conditions of the purpose of use of the respective temperature control plate. The spacing can also be greater with completely closed islands between two channel sections.

In particular metal sheets of aluminum alloys and/or steel having a sheet thickness of 0.5 to 2 mm are used here.

Provision can be made in an alternative embodiment here that the two layers between all the first and second channel sections that are each nearest neighbors are welded to one another by two weld seams. This is particularly advantageous if the throughflow direction in the first and second channel sections is in parallel (that is not antiparallel), which is in particular the case when the inlet and outlet are arranged at oppositely disposed wide sides of the plate-like fluid container and the lengths of the first and second channel sections are located extending behind one another along the length of the plate-like fluid container between the inlet and the outlet.

Provision is made in another advantageous embodiment that at least one channel side wall of at least one first channel section that is oriented toward another first channel section or is directly adjacent to the outer edge of the fluid container is steeper than a channel side wall of a second channel section that is oriented toward a channel side wall of the second channel section, in particular stepper than the channel side walls of all the second channel sections that are each oriented toward a channel side wall of the second channel section. A channel side wall of a respective channel section can here be understood as a wall of the channel section extending parallel to the respective throughflow direction that is substantially perpendicular to the main plane of extent of the fluid container. "Substantially perpendicular" here means "perpendicular with at most a predefined deviation", with the predefined deviation being able to be a maximum of 40°, a maximum of 30°, or a maximum of 20°, for example. The orientation of such a wall can here be understood as a normal vector of the side wall, also average with a curved channel side wall, that continues from the channel section. One channel side wall is then steeper than another channel side wall when the angle (averaged with a curved channel side wall) between the channel side wall and the main plane of extent of the fluid container of the one channel side wall is larger than that of the other channel side wall. The one channel side wall is accordingly steeper than the other channel side wall when the angle of the one channel side wall between the normal vector of the one channel side wall and the main plane of extent of the fluid container is smaller than the angle of the other channel side wall between the normal vector of the other channel side wall and the main plane of extent of the fluid container.

This has the advantage that a cross-section of the channel section can be optimized by the steeper channel side wall without the otherwise typical problems due to the increased material feed so that a pressure drop in the channel side wall can be further minimized. The temperature control performance is thereby further homogenized. Such a variation in the steepness of the channel side walls is not possible with a uniform spacing of the channel sections since, due to the manufacture, a steeper channel side wall requires a greater drawing in of material that is actually only made possible by the increased spacing of the channel sections. The channel width can, however, remain unchanged here. A large material thickness is furthermore advantageous here since the material thinning accompanying the formation of the steep channel side wall can be implemented particularly simply.

Provision can also be made that a channel cross-section area of channel sections in a region disposed upstream is smaller than in a region disposed downstream. For example, the channel cross-section area upstream can be smaller, but larger downstream, than a predefined value of, for example, 0.3 cm$^2$. The region disposed upstream can, for example, be the first region of the first channel sections and the region disposed downstream can be the second region of the second channel sections. However, both regions can also be in the first and/or second regions and the channel cross-section area of the first and/or second channel sections can, for example, reduce within the respective first or second regions. The channel diameter can here designate individual channel cross-section areas of respective channel sections or a total channel cross-section area of all the channel sections in the respective region. The relative flow speed in the different regions can thus be matched to the heat take-up and/or heat output capability of the fluid in the different regions.

Provision is made in a further advantageous embodiment that the first of the two layers has a flat layer, that is layer that has no or substantially no recess or elevated portion, and the second of the two layers has at least a recess on its side facing the first layer that defines the extent of the fluid channel system, that is the topography of the channel structure. The second layer can in particular be an embossed layer. Further functional elements optionally present at the outer margin of one of the layers, in particular functional elements independent of the steering function of the fluid channel system for the fluid such as current collectors projecting from the layer plane are left out of consideration in this manner of observation. This has the advantage, for example, that the second layer can be optimized with respect to its plastic properties and the first of the two layers with respect to its thermal properties, whereby a more homogeneous temperature control performance can in turn be achieved. Technical production advantages moreover result here that can also be advantageous with respect to manufacturing costs.

Provision can in particular be made here that the first layer is harder and/or thicker than the second layer. The technical production demands on the second layer thereby fall so that the above-described advantages can be achieved in a particularly simple manner.

Provision is made in a further advantageous embodiment that the second layer has at least one passage opening in the region between the two weld seams between two channel sections nearest to one another. This passage opening fluidically couples a space between the layers with an environment of the fluid container.

This has the advantage on a leak in one of the weld seams that can be part of an annularly closed weld seam—that appears locally as a double weld seam in a cross-sectional observation—that the fluid—for example gas for test purposes, liquid in operation—is discharged from this passage opening and the leak can thus be detected. This also contributes to the improved temperature control since a liquid or fluid loss potentially reduces the cooling power, for example by a change of the fluid dynamic properties of the cooling channel system. It can thus also be ensured by a suitable arrangement of the fluid container, for example in a gravitational field below a battery with the first layer facing the battery and the second layer facing away from the battery, that on a leak the discharged fluid is drained to the bottom, that is away from the battery, which also increases operating safety.

A further aspect relates to an accumulator device for electrical energy having a fluid container in accordance with one or more of the described embodiments or to an electrical consumer having a fluid container in accordance with one or more of the described embodiments.

Another aspect is a vehicle or a motor vehicle, in particular a vehicle or a motor vehicle having an electrical traction drive motor, having such an accumulator device for electrical energy, or having such an electrical consumer.

Exemplary plate-like fluid containers will be described in more detail in the following with reference to the figures. Different elements that are essential to the invention or are also advantageous and that go further are named here within the framework of a respective specific example, with individual ones of these elements also being able to be used as such to further develop the invention—also removed from the context of the respective example and further features of the respective example. The same or different reference numerals are furthermore used for the same or similar elements in the Figures and their explanation has therefore been omitted in part.

BRIEF DESCRIPTION OF THE FIGURES

FIG. 4A shows a plan view of a plate-like fluid container and FIGS. 4B and 4C show detailed views in accordance with a second embodiment;

DETAILED DESCRIPTION

Figure 1A:
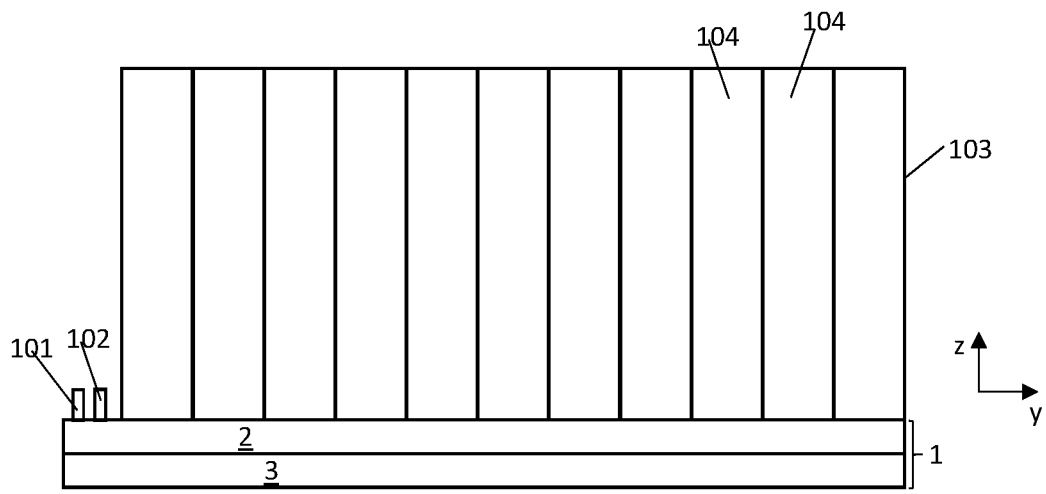
FIGS. 1A and 1B show a side view and a plan view of a plate-like fluid container on which battery cells are arranged.
Figure 1B:
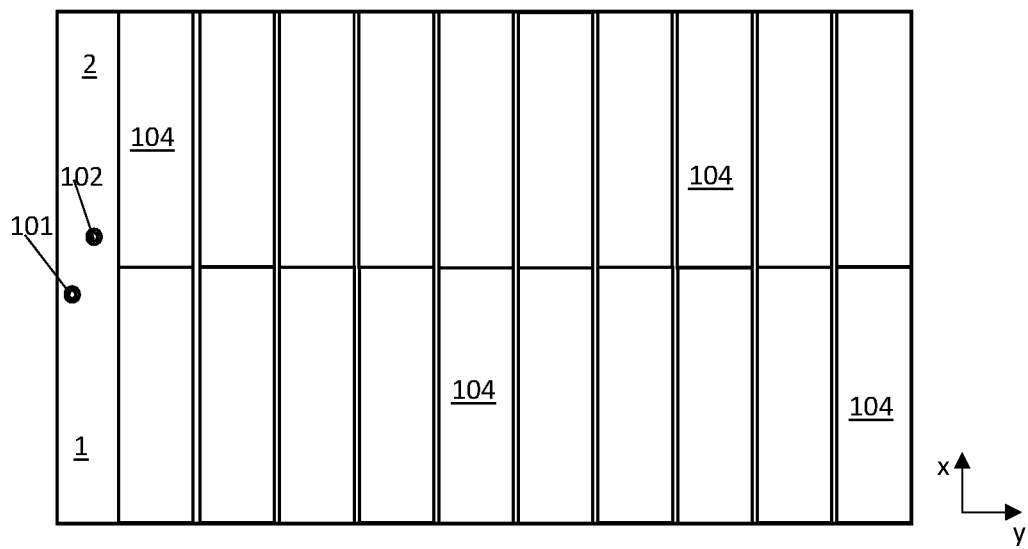

FIG. 1 shows in part illustration 1A a side view of a fluid container 1, namely of a battery temperature control plate 1, having a first, upper layer 2 that is configured as a flat layer and a second lower layer 3 that has—not visible here—at least one recess that defines the extent of the fluid channel on its side facing the first layer 2. A battery pack 103 comprising battery cells 104 is arranged on the upper layer 2. The battery pack 103 and the temperature control plate 1 are located in heat conductive contact. The temperature control fluid is conducted from a feed line via an inlet spout 101 arranged at an end of the temperature control plate 1 into the fluid channel system of the temperature control plate 1. After flowing through the fluid channels of the fluid channel system in the temperature control plate 1, the temperature control fluid is drained from the temperature control plate 1 via an outlet spout 102 likewise arranged at the end of the temperature control plate 1. The throughflow here takes place continuously in most operating states.

Figure 2:
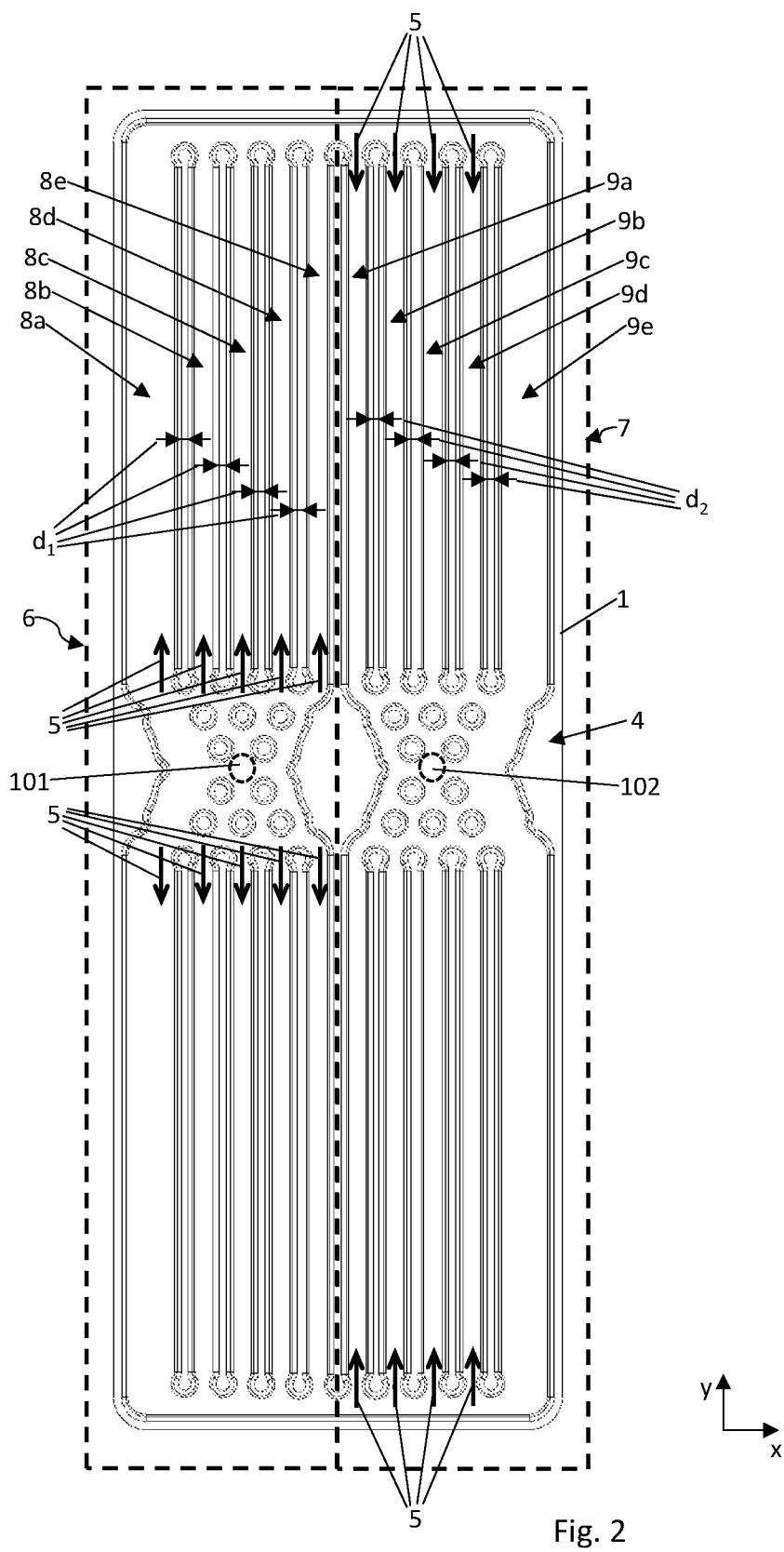
FIG. 2 shows a plan view of a plate-like fluid container of the prior art.

FIG. 2 shows a plan view of a plate-like fluid container of the prior art, more exactly a plan view of a second layer of the plate-like fluid container. The regions on which the inlet 101 and the outlet 102 are arranged here on the side of the plate-like fluid container 1 facing away from the observer is here indicated by dashed circles. Arrows 5 in the fluid channel system 4 indicates the respective local, that is sectional, throughflow direction in which a corresponding fluid flows from the inlet 101 to the outlet 102 during temperature control. In the example shown, the fluid first flows from the inlet 101 into a first region 6 during temperature control and from there into a second region 7 before the fluid leaves the fluid channel system 4 and the plate-like fluid container 1 through the outlet 102 at a changed temperature. The first region 6 can therefore be called a region disposed upstream, the second region 7 a region disposed downstream.

A plurality of channel sections 8a to 8e extending parallel to one another are present in the first region 6. A plurality of second channel sections 9a to 9e extending parallel to one another are also correspondingly present in the second region 7. Here, however, the first spacing $d_1$ between the first channel sections 8a to 8e and the second spacing $d_2$ between the channel sections 9a to 9e of the second region 7 are identical in the present case. A different temperature of the adjacent battery cells in the first region 6 and in the second region 7 will therefore be adopted, that is an inhomogeneous temperature control performance will be reached, with the described fluid container of the prior art during the temperature control.

Figure 3:
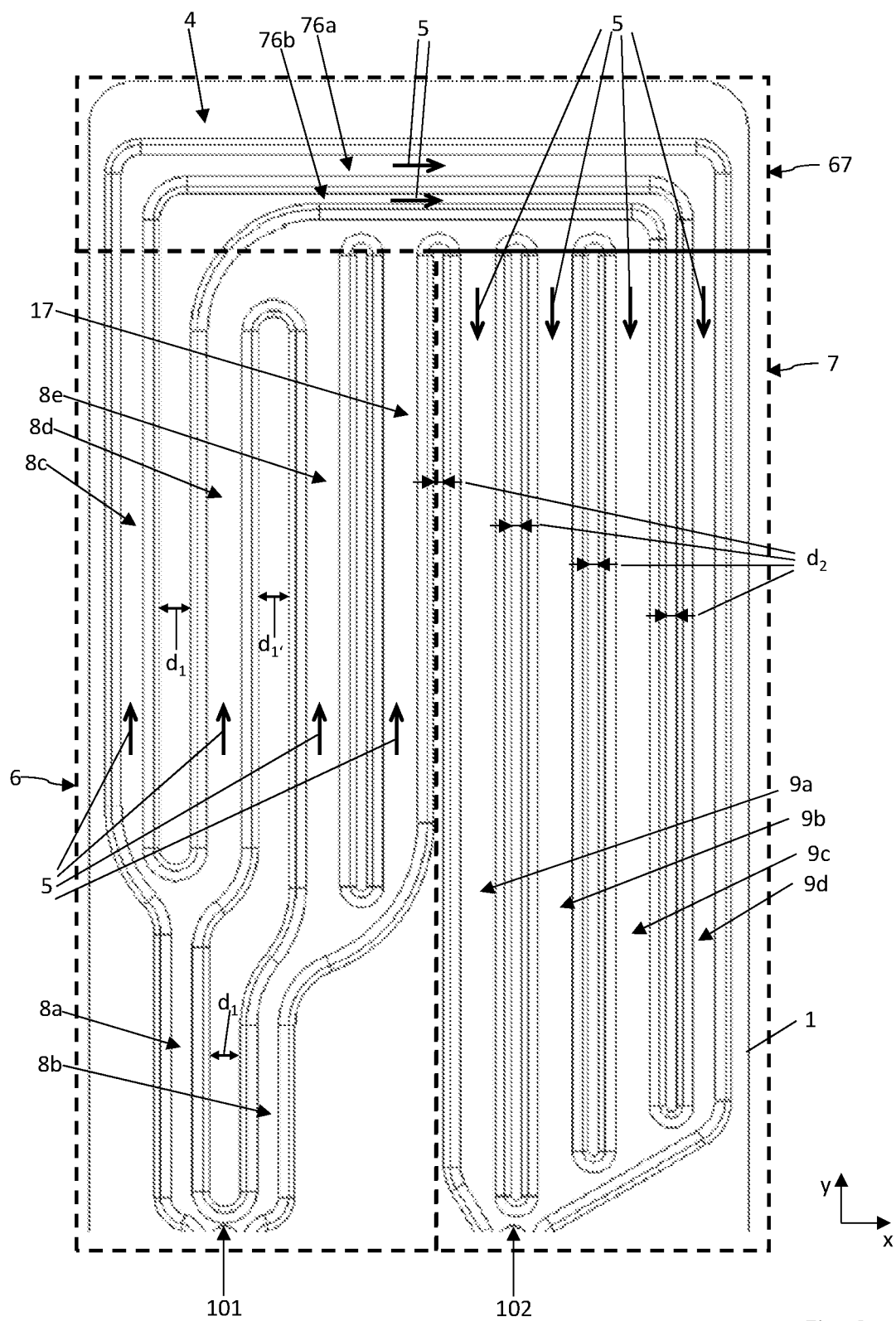
FIG. 3 shows a plan view of a plate-like fluid container in accordance with a first embodiment.

A plan view of a plate-like fluid container in accordance with a first embodiment is now shown in FIG. 3. The fluid container 1 is here only shown sectionally. The inlet 101 and the outlet 102 are thus not shown; corresponding arrows point, however, to the approximate region in which the inlet 101 and the outlet 102 are arranged. The inlet 101 and the outlet 102 are here attached in an exemplary manner in the present case in a manner similar to the embodiment shown in FIG. 2 on the plate of the fluid container 1 that faces away from the observer and that can be designed as a smooth plate.

A plurality of first channel sections 8a to 8e, five in total in the present case, that extend parallel to one another are here again arranged in the first region 6 disposed upstream. They are here each arranged spaced apart from one another at the first spacing $d_1$. In the second region 7, arranged downstream in comparison with the first region, the fluid channel system 4 likewise has a plurality of second channel sections 9a to 9d, four in the present case, that extend parallel to one another and that are each arranged at the second spacing $d_2$ from one another. The respective spacings $d_1$, $d_2$ are here measured perpendicular to a throughflow direction of the respective channel sections in the present case. The first spacing $d_1$ is here larger than the second spacing $d_2$. Provision can also be made that there are a plurality of different first spacings $d_1$ and a plurality of different spacings $d_2$. In this case, the first spacings $d_1$ are larger than at least one second spacing $d_2$, and may be larger than all the second spacings $d_2$. In addition to the first region 6 arranged upstream and the second region 7 arranged downstream, the fluid channel system 4 here has a reversal region 67 that is arranged between these two regions and that connects the two regions 6, 7. In the present embodiment, exactly one such reversal region 67 is present having a plurality of fluid flow paths next to one another and changing their direction.

In the example shown, the fluid channel system 4 divides starting from the inlet 101 into two first channel sections 8a, 8b that extend in parallel at the spacing $d_1$ in the positive y direction. In the present case, the two channel sections 8a and 8b then divide again into further first channel sections 8c and 8d or into a first channel section 8e and a further channel section 17. These channel sections here likewise extend in parallel in the positive y direction, with the first channel sections 8c to 8f having the first spacing $d_1$. The different first channel sections 8d and 8e and the further channel section 17 of the first region 6 combine into a mixing reversal channel section 76b of the reversal region 67, in so doing undergo a change of direction and merge, while branching, into the second channel sections 9a to 9c of the second region 7. The first channel section 8c here merges in the present case via a reversal section 76a into the second channel section 9d without here combining with further channel sections. The reversal channel section 76a of the reversal region 67 can thus be called a non-mixing reversal channel section 76a. The second channel sections 9a to 9d here extend in the example shown in the negative y direction and combine toward the outlet 102 so that the inlet 101 and the outlet 102 can here be found in approximate vicinity with one another.

The arrows 5 indicating the direction of flow extend in the reversal region 67 at an angle of approximately or substantially 90° to the corresponding arrows 5 in the first region 6 disposed upstream. The arrows 5 indicating the direction of flow in the second region 7 disposed downstream equally extend at an angle of approximately 90° to the corresponding arrows 5 in the reversal region 67. The transition from the first region 6 disposed upstream via the reversal region 67 into the second region 7 disposed downstream therefore effects a change of the direction of flow of the temperature control fluid by 180°. More than one channel section here extends in the reversal region 67 in the present case. In the present example, the non-mixing reversal channel section 76a and the mixing reversal channel section 76b extend next to one another in the reversal region 67, and indeed here also to the larger part, that is over more than 50% of their length, parallel to and directly adjacent to one another, i.e. without a further flow path extending therebetween. The change of direction of the direction of flow here takes place in a plurality of flow paths next to one another. In other words, the flow path including the non-mixing reversal channel section 76a surrounds the flow path including the mixing reversal channel section 76b at three sides in the example shown. It is thus arranged between the last-named flow path and a margin of the fluid container. The second channel sections 9a to 9d here extend over around 80% of the length of the fluid container 1 measured in the y direction. The two first channel sections 8a and 8b extend over more than 10% of the length of the fluid container in they direction and the further channel sections 8c to 8e and 17 over more than 40% of the length of the fluid container 1 measured in the y direction. A change of direction of the fluid flow only results in the first region 6 disposed upstream in the example shown in the region of the branching of the first channel sections 8a, 8b into the further first channel sections 8c to 8e and 17, with the largest change of direction here occurring between the first channel sections 8b and 17. However, at 65° it is here less than 75°. No change of direction takes place here in the second channel sections 9a to 9d. The temperature control fluid thus only undergoes two changes of direction of more than 75°, namely the two 90° changes in the region of the reversal region 67. Only a small pressure drop of the temperature control fluid occurs due to the change of direction restricted to a minimum.

In a temperature control operation, for example in a cooling operation, the comparatively cold fluid is now fed into the inlet 101, but there develops a substantially smaller cooling effect due to the few first channel sections 8a and 8b and the first channel sections 8c to 8e adjoining them that are here arranged at a comparatively large spacing $d_1$ from one another than would be the case if the throughflow direction were reversed and the fluid were fed unto the outlet 102 as the inlet and would immediately be distributed over the second sections 9a to 9d arranged at the comparatively small spacing $d_2$.

Due to the smaller area taken up by the channels in the region 6 and in particular in the region of the channels 8a and 8b and to the smaller throughflow cross-section associated therewith, the fluid flows faster in these regions than in the region 7. The fluid in the region 6 can hereby take up less thermal energy in comparison with an arrangement in the region 6 of FIG. 2 so that there is only a moderate temperature increase. The temperature difference between the adjacent battery cells to be temperature controlled and the fluid container is thus higher on the transition from the region 6 into the region 7, here that is in the reversal region 67, than in a comparable assembly of the prior art. A more effective temperature control in the region 7 is hereby possible so that the thermal transfer in the first region 6 and in the second region 7 is homogenized overall, that is takes place more uniformly than in previously known fluid channel topographies.

A plan view of a plate-like fluid container in accordance with a second embodiment is shown in FIG. 4A. The fluid container 1 is here again only shown sectionally. This embodiment is here largely designed as the embodiment shown in FIG. 3. Two channel sections 76 in turn result in the reversal region 67, namely a mixing and a non-mixing reversal channel section 76a, 76b.

Here, however, the weld seams 10 to 16 are additionally drawn to illustrate the connection technique for the two layers 2, 3. The weld seam 16 is here a peripheral weld seam directly at the margin of the fluid container for general sealing in the present case. The weld seam 10 in this example seals the first channel sections 8c and 8b with respect to one another and the second channel sections 9c and 9c. The weld seam 10 is here regionally designed as an annular double weld seam, namely in the region in which it seals the first channel sections 8c and 8c. A double weld seam is here a weld seam that appears as two weld seams in cross-section, for example perpendicular to the channel walls of the channel section 8c. In the region of the second channel sections 9c and 9d, in contrast, the weld seam 10 here seals as an individual seam extension appended to the annular region of the weld seam 10. The weld seam 11 is likewise designed as an annular double weld seam, but without an individual seam extension in the present case. In the example shown, it seals the channel sections 8a, 8b, 8d, and 8e from one another. The weld seam 12 is here an individual weld seam and in the present case seals the first channel section 8e with respect to the further channel section 17 that is arranged at a smaller spacing, for example the second spacing $d_2$, remote from the first channel section 8e. In a similar manner to the weld seam 12, the weld seams 14 and 15 also seal channel sections from one another in this example that are arranged at a small spacing, namely the spacing $d_2$, from one another.

FIG. 4B represents a perspective sectional view of the section A-A of FIG. 4A. On the one hand, the simple weld seam 12 is shown there that welds the second layer 3 between the first channel section 8e and the further channel section 17 to the first layer 2 and so seals the two channel sections from one another. The double weld seam 11 is likewise shown that in the form of its two weld seams 11a and 11b welds the second layer 3 between the first channel section 8d and the first channel section 8e to the first layer 2. The use of the double weld seam here prevents the second layer 3 from being deformed on an elevated pressure load in the region between the two first channel sections 8d and 8e and thus enables a particularly reliable and long-lasting pressure resistance despite the increase of the spacing of the first channel sections 8d and 8e in comparison with the spacing $d_2$ between the further channel section 17 and the first channel section 8e that has already been reliably and long-lastingly established by the simple weld seam 12.

A further detail view is shown n FIG. 4C that shows the design option shown in region B in FIG. 4A of an end of the simple weld seam 12 that can naturally be applied to every further simple weld seam. In this respect, the weld seam 12 is configured at its end in a circular shape 12', as a circle with an inwardly disposed curved weld seam end extending as a loose end toward the center of the circle in the present case.

Figure 5:
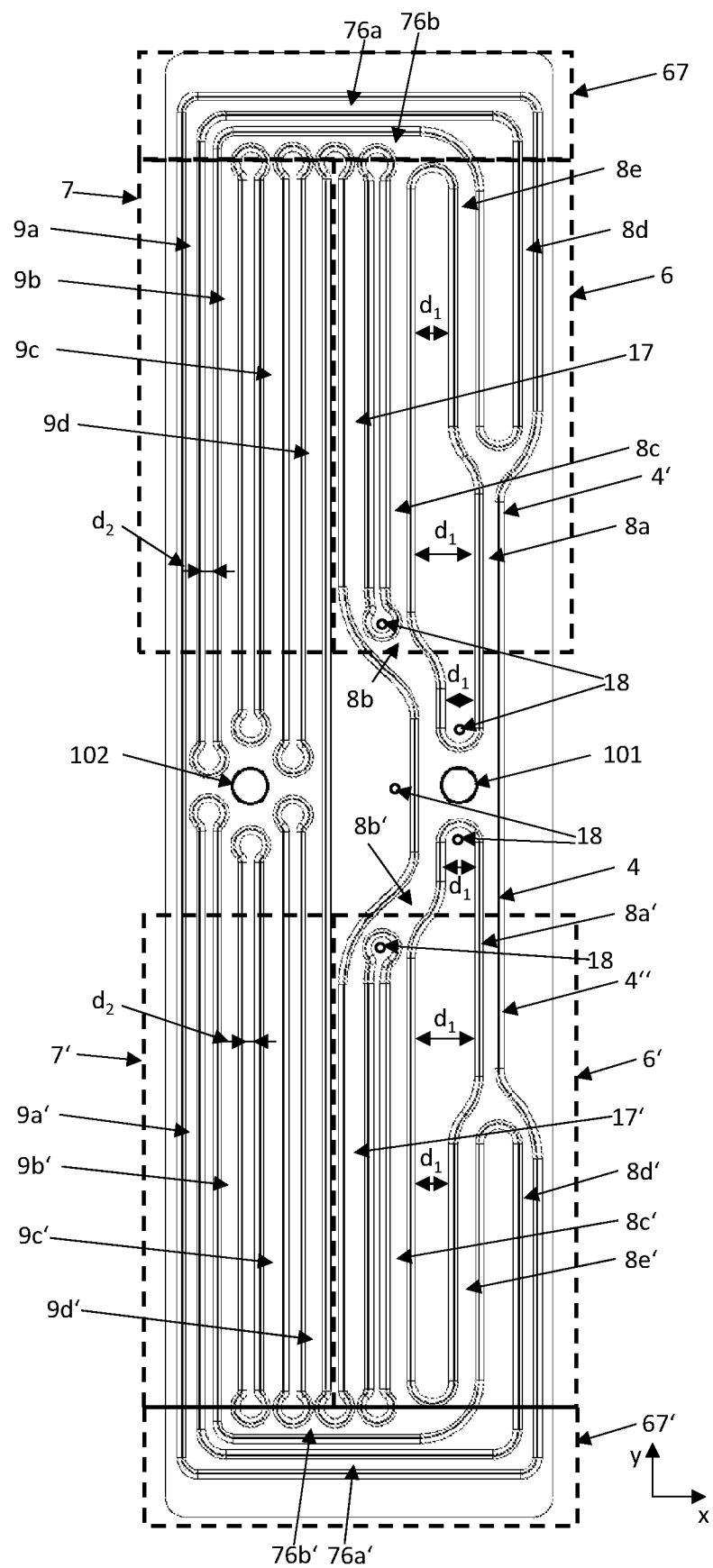
FIG. 5 shows a plan view of a plate-like fluid container in accordance with a third embodiment.

A plan view of a plate-like fluid container in accordance with a further, third embodiment is shown in FIG. 5. The inlet 101 and the outlet 102 are here now on the side facing the observer in the present case, that is in the second layer 3. The fluid channel system 4 is here divided into a plurality of fluid channel part systems 4' and 4", two here, in the present case. Both part channel systems 4' and 4" here each fluidically couple the inlet 101 with the outlet 102. Furthermore, both fluid channel part systems 4' and 4" have a first region 6, 6', a reversal region 67, 67', and a second region 7, 7' disposed downstream in comparison with the first region 6, 6'. The respective fluid channel part system 4', 4" here has first channel sections 8a to 8d or 8a' to 8d' in the two first regions 6, 6' that extend adjacent to and parallel to one another in a plurality of first spacings $d_1$ (different here). In the second ranges 7, 7', the two fluid channel part systems 4', 4" each have second channel sections 9a to 9d or 9a' to 9d' that, corresponding to the described embodiments, extend adjacent to and parallel to one another at one or more second spacings $d_2$. The different spacings $d_1$ in the example shown are in this respect always larger than the spacing $d_2$ or the spacings $d_2$.

Exactly one reversal region 67, 67' respectively having a plurality of fluid flow paths next to one another and changing their direction are here present per fluid channel part system 4', 4". The two reversal regions 67, 67' here together comprise 17.5% of the area of the plate-like fluid container 1, that is considerably less than ⅓ of the area. A temperature control of the accumulator device is hereby ensured that is as uniform as possible.

The second layer 3 in the present case has a passage opening 18 in the region between the two weld seams between the two channel sections 8a' and 8b' nearest one another and in the region between the two weld seams between the two channel sections 8a and 8b nearest to one another, and in the region between the two weld seams between the two channel sections 8b/b' and 9d/d' nearest to one another, and in the region between the two weld seams between the two channel sections 8a/e and 8b/c nearest to one another, and in the region between the two weld seams between the two channel sections 8c and 17 or 8c' and 17' nearest one another.

Figure 6:
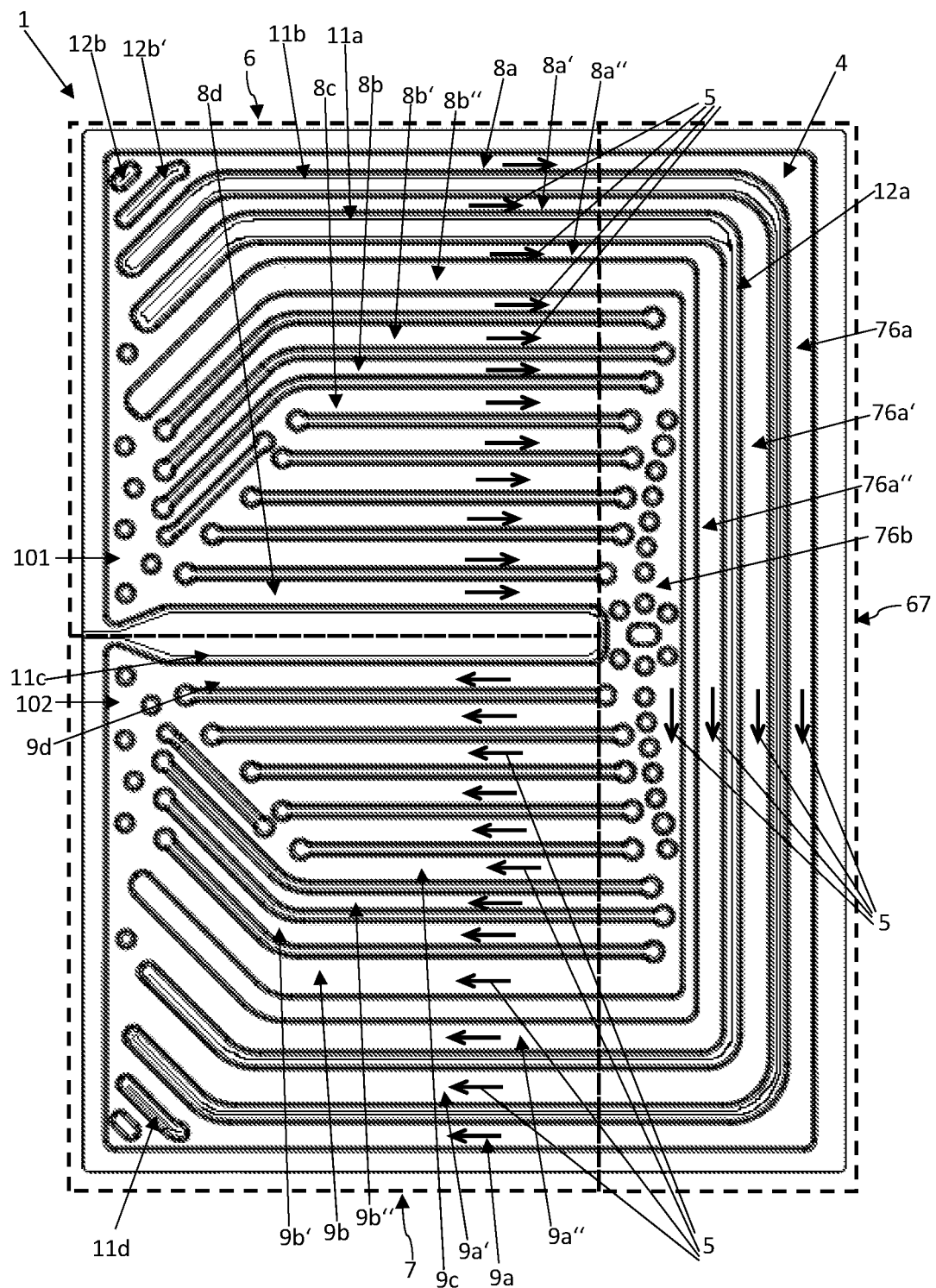
FIG. 6 shows a plan view of a plate-like fluid container in accordance with a fourth embodiment.

FIG. 6 represents a further embodiment in which the first region 6 of the fluid channel system 4 disposed upstream takes up a smaller base area than the second region 7 disposed downstream, even though both have the same extent in the y direction. The inlet 101 and the outlet 102 are in turn only indicated by arrows since they are formed on the surface of the plate-like fluid container facing away from the observer.

The embodiment of FIG. 6 furthermore differs from the aforesaid in that it has a plurality of channel sections 76a, 76a', 76a" in the reversal section 67 that each connect exactly one first channel section 8a, 8a', 8a" of the first region disposed upstream to exactly one second channel section 9a, 9a', 9a" of the second region 7 disposed downstream and can thus be considered as non-mixing reversal channel sections 76a, 76a', 76a". In the present case, they enclose exactly one channel section 76b of the reversal region 67 at three sides in the x-y plane, in which reversal region 67 fluid from a plurality of first channel sections 8b, 8b', 8b", 8c to 8d, of which not all are provided with their own reference numerals, undergoes a reversal of direction of a mean direction of flow and is conducted onward into a plurality of second channel sections 9b, 9b', 9b", 9c to 9d, of which not all have been provided with their own reference numerals. Fluid of the different first channel sections 8b, 8b', 8b", 8c to 8d is mixed here and branches to the different second channel sections 9b, 9b', 9b", 9c to 9d; the channel section 76b can here thus be considered as a mixing reversal channel section.

In the present example, three non-mixing reversal channel sections 76a, 76a', 76a" and the mixing reversal channel section 76b therefore extend next to one another in the reversal region 67, and indeed here also parallel to and directly adjacent to one another, i.e. without a further channel section or other flow path extending therebetween. The change of direction of the (mean) direction of flow here takes place next to one another in this plurality of flow paths, i.e. in sections respectively disposed nearest one another.

The arrows 5 indicating the local throughflow direction in this example extend in the reversal region 67 at an angle of approximately or substantially 90° to the corresponding arrows 5 in the first region 6 disposed upstream. The arrows 5 in the second region 7 disposed downstream indicating the local throughflow direction equally extend at an angle of approximately 90° to the corresponding arrows 5 in the reversal region 67.

For reasons of clarity of the illustration, only a few of the weld seams were shown by way of example in FIG. 6. For instance, the flow path that comprises the channel sections 8a, 76a, and 9a is thus separate from the flow path that comprises the channel sections 8a', 76a' and 9a' by a double seam 11b that is closed toward the ring in the present case and that here has an approximately C-shaped extent overall. In this respect, the double seam 11b in the example shown has a greater spacing upstream, here between the channel sections 8a and 8a', between its individual seams than downstream, here between the channel sections 76a and 76a' and 9a and 9a'. The flow path that comprises the channel sections 8a', 76a', and 9a' is separated via a further weld seam from the flow path that comprises the channel sections 8a", 76a", and 9a". This weld seam in the example shown consists of a double seam 11a, whose ends merge, upstream, here between the channel sections 8a' and 8a" and continue without interruption downstream, here between the channel sections 76a' and 76a" and further between the channel sections 9a' and 9" as a simple seam 12a.

The weld seam 11c, that here separates the channel sections 8d and 9d and thus the first region 6 from the second region 7, is designed as a double seam in the present case, whose free ends are guided to the outer margins of the plate-like fluid container 1 and end just before the outer margin, but outside a weld seam, that is not shown here, that connects the two layers of the fluid container and is peripherally closed around the outer margin.

It is further shown with reference to a plurality of short weld seams that shorter regions disposed between channel sections in which the two layers lie over one another can be connected to one another by means of simple seams such as the simple seams 12b, 12b' or by means of double seams such as the double seam 11d. In the latter, the ends of the weld seam disposed upstream merge in the example shown, while the ends disposed downstream end separately from one another.

In the previously described exemplary embodiments, the first channel sections 8a to 8e and the second channel sections 9a to 9b all extend antiparallel, that is parallel to an oppositely oriented throughflow direction. It is, however, also conceivable with a corresponding change of the relative arrangement of the inlet 101 and the outlet 102 that the first channel sections 8a to 8e and the second channel sections 9a to 9s extend in parallel in the same orientation so that the throughflow direction in the respective channel sections also extends in the same direction, for example in a positive or negative y direction. For this purpose, the second region 7 can be "flipped up", that is arranged above the first region 6 in the positive y direction. A similar procedure could also be carried out for the further second region 7' and the further first region 6', with then, for example, the second region having to be arranged in the negative y direction below the first region. The respective outlet would naturally correspondingly likewise have to be repositioned so that in this described exemplary variant, the first and second regions 6, 7 are arranged in the y direction between the inlet 101 and the outlet 102.

Figure 7:
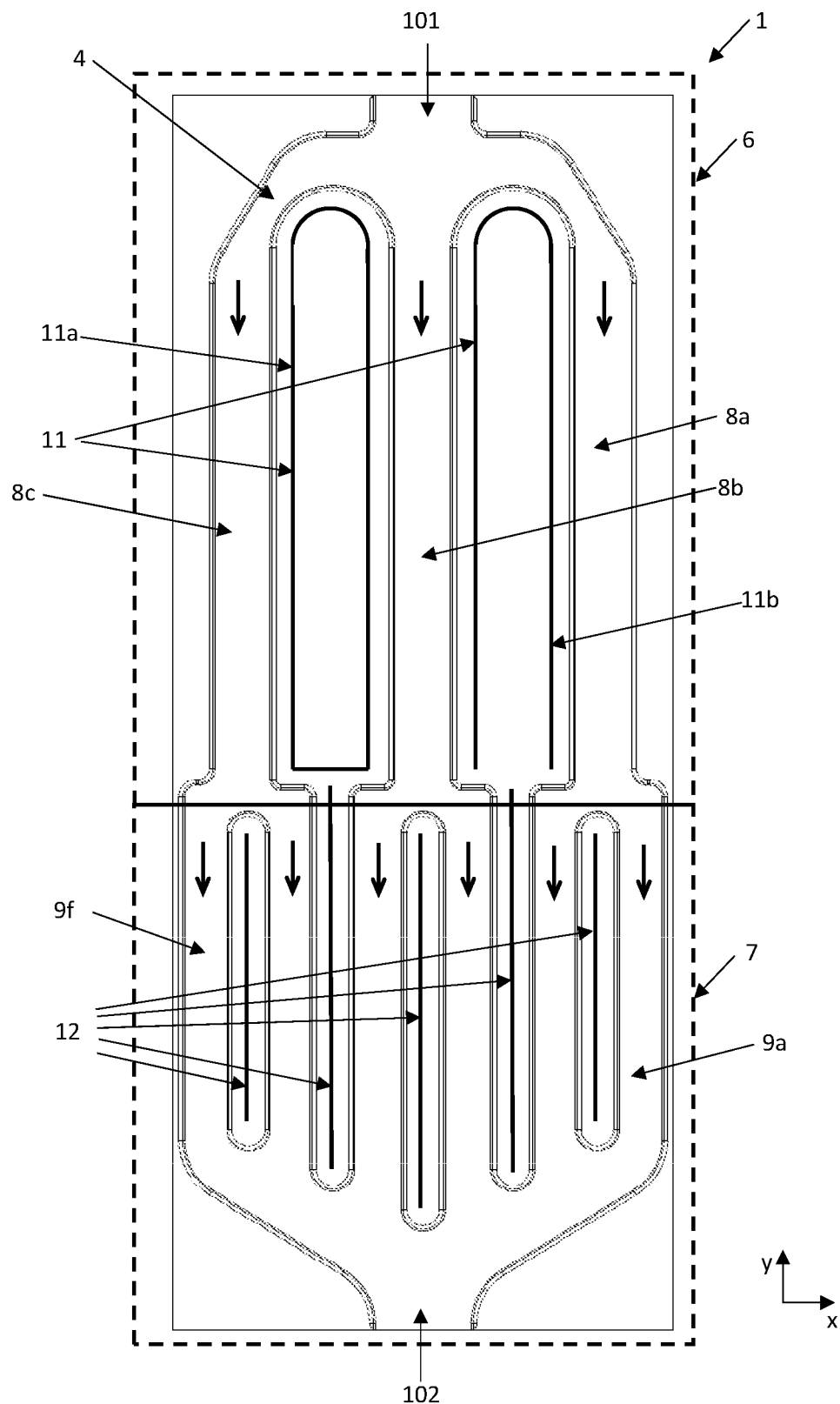
FIG. 7 shows a plan view of a plate-like fluid container in accordance with a fifth embodiment.

A corresponding further embodiment is shown in FIG. 7 in which the two layers between all the first channel sections 8a, 8b, 8c, that are each nearest neighbors, are welded to one another by two weld seams, i.e. double weld seams 11, while the second channel sections 9a to 9f are connected by simple weld seams 12. The double weld seam 11a is here designed as an annularly closed seam, it therefore terminates an island. The double weld seam 11b is in contrast only formed in U shape. The combination of two weld lines appearing as double weld seams in cross-section with a complete and incomplete circular termination is here only exemplary; only insular sections could equally be present between the channel sections or only open double weld seams. The throughflow direction in the first and second channel sections is furthermore in parallel (that is not antiparallel) and the inlet 101 and the outlet 102 are arranged at oppositely disposed wide sides of the plate-like fluid container. The lengths of the first and second channel sections are located along the length of the plate-like fluid container extending behind one another between the inlet 101 and the outlet 102. The temperature control fluid here does not undergo one single change of direction of more than 75° so that only a very small pressure loss also occurs here.

Figure 8A:
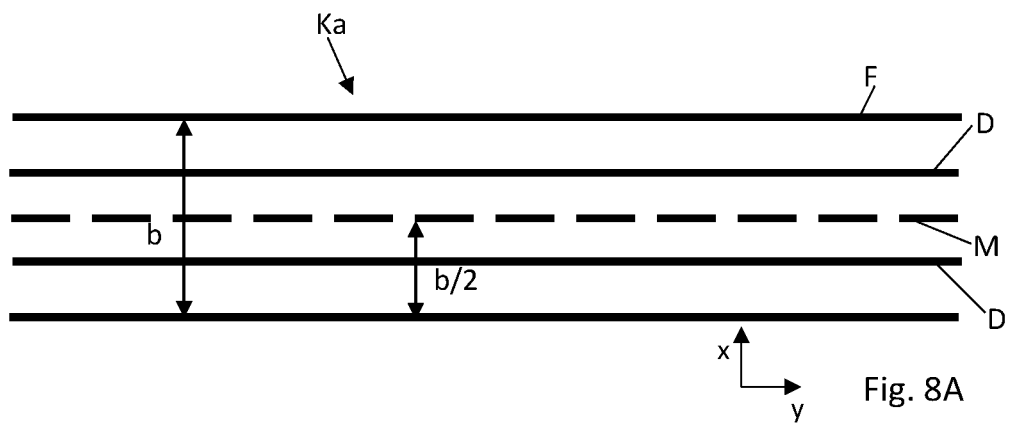
FIGS. 8A-C show exemplary channel extents of plate-like fluid containers in accordance with the invention.
Figure 8B:
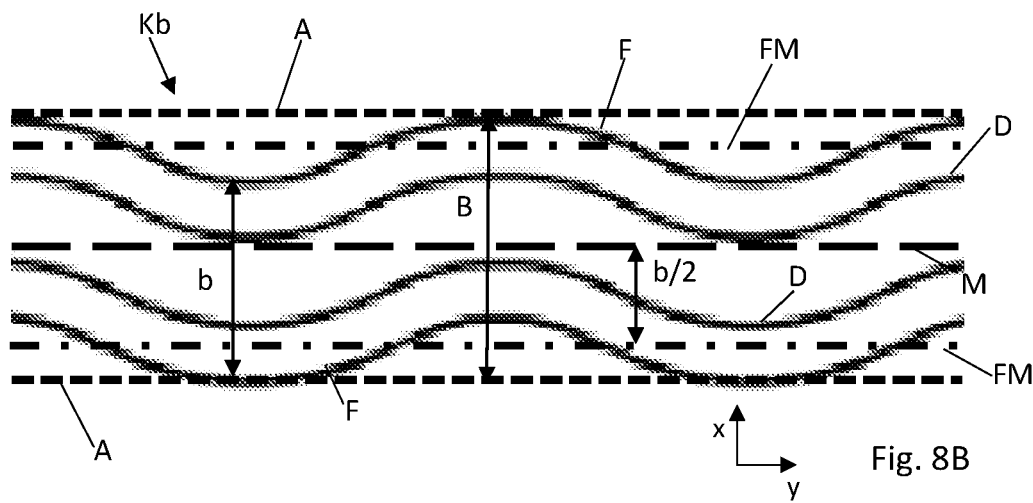
Figure 8C:
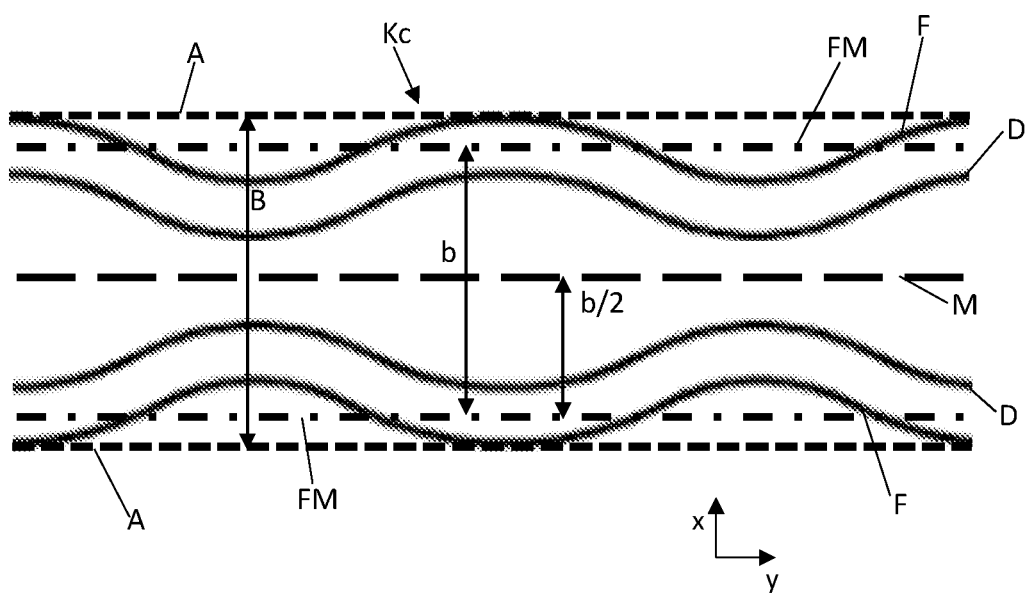

FIG. 8 shows in three part FIGS. 8A-C exemplary details from plan views of channel sections of fluid containers in accordance with the invention that can be both channel sections 8 of a first region disposed upstream, channel sections 76 of a reversal region 67, and channel sections 9 of a second region disposed downstream or parts of such channel sections and are generally marked by K or Ka, Kb, Kc. The base lines of a channel section are here each marked by F; the lines marked by D schematically bound the region in which the channel has a constant maximum height.

While the channel section Ka of the part FIG. 8A extends in a straight line and has a constant width b between the two base lines F of the channel arching, the channel section Kb of part FIG. 8B extends in wave shape, but likewise at a constant width b. In contrast, the channel section Kc of part FIG. 8C constantly changes its width b, with the base lines F likewise describing wave lines that, however, have mirror symmetry with one another.

The long dashed line M in all three part FIGS. 8A-C designates the center line of the respective channel section. In part FIGS. 8B and 8C, the chain dotted lines extend at a spacing b/2 at both sides of the center line M; they therefore represent the averaged base lines FM of the channel sections, while the short dashed lines a indicate the maximum deflection of the channel bases and connect the corresponding points of maximum deflection. With channel extents as shown in the part FIGS. 8B and 8C, channels can be considered as extending in parallel in the sense of the present disclosure in which $b \leq B \leq 1.5b$ applies. B can be illustrated as a width of a rectangular area taken up by the channel section K on the fluid container, that is an effective width B, and b as the local actual width b of the respective channel section K. A weld connection along the base lines can here respectively follow the base lines, can be formed as straight, i.e. parallel to the center line M, or wave-shaped, i.e. with a regularly varying spacing from the center line M that can be constant or self-varying or have a mixed form of the variants shown.

The invention claimed is:

1. A plate-like fluid container for the temperature control of an accumulator device for electrical energy or of an electrical consumer, the fluid container comprising:
two layers abutting to one another at least regionally;
an inlet for the pouring of a fluid into the fluid container;
an outlet for discharging the fluid out of the fluid container; and
a fluid channel system that is arranged between the layers, that connects the inlet to the outlet, and is configured to be flowed through by the fluid during the temperature control,
wherein a spacing of at least two first channel sections of the fluid channel system extending parallel to one another is larger in a first region of the fluid channel system disposed upstream than a spacing of at least two second channel sections of the fluid channel system extending parallel to one another in a second region of the fluid channel system disposed downstream;
wherein the two layers between the first channel sections that are each nearest neighbors are welded to one another by two weld seams and the two layers between the second channel sections that are each nearest neighbors are only welded to one another by one weld seam.

2. The fluid container of claim 1, wherein the first channel sections extend parallel to the second channel sections, with the direction of flow in the first channel sections extending parallel to or antiparallel to the direction of flow in the second channel sections.

3. The fluid container of claim 1, wherein the channel sections of the fluid channel system extending parallel to one another each extend in a straight line over at least 50% of the length or width of the fluid container.

4. The fluid container of claim 1, wherein a channel width in the first and second channel sections is substantially the same when viewed in a plane of the main extension of the fluid container.

5. A fluid container in accordance with claim 1, wherein the spacing of the first channel sections from one another is larger than half the channel width and/or the spacing of the second channel sections from one another is smaller than half the channel width.

6. The fluid container of claim 1, wherein a reversal region is arranged between the first region, disposed upstream of the reversal region, and the second region, disposed downstream of the reversal region,
the reversal region has at least one further channel section that fluidically couples a respective at least one of the first channel sections with a respective at least one of the second channel sections, and
a part of the at least one further channel section following the first channel sections downstream extends at an angle between 80° and 100° to the first channel sections and a second part of the at least one further channel section adjoining the second channel sections upstream extends at an angle between 80° and 100° to the second channel sections.

7. The fluid container of claim 1, wherein the first channel sections extending parallel to one another and/or the second channel sections extending parallel to one another are configured to conduct part flows of the fluid flowing in parallel and the first channel sections extending parallel to one another and/or the second channel sections extending parallel to one another are each nearest neighbors.

8. A plate-like fluid container for the temperature control of an accumulator device for electrical energy or of an electrical consumer, the fluid container comprising:
two layers abutting to one another at least regionally;
an inlet for the pouring of a fluid into the fluid container;
an outlet for discharging the fluid out of the fluid container; and
a fluid channel system that is arranged between the layers, that connects the inlet to the outlet, and is configured to be flowed through by the fluid during the temperature control,
wherein a spacing of at least two first channel sections of the fluid channel system extending parallel to one another is larger in a first region of the fluid channel system disposed upstream than a spacing of at least two second channel sections of the fluid channel system extending parallel to one another in a second region of the fluid channel system disposed downstream;
wherein the two layers between all first and second channel sections that are each nearest neighbors are welded to one another by two weld seams; and
wherein a spacing between the weld seams in the first channel sections is greater than a spacing between the weld seams in the second channel sections.

9. The fluid container of claim 1, wherein a channel side wall of at least one first channel section that is oriented toward another first channel section or is directly neighboring the outer edge of the fluid container is steeper than a channel side wall of a second channel section that is oriented toward a channel side wall of the second channel section, and the channel side walls of all second channel sections that are each oriented toward a channel side wall of the second channel section.

10. The fluid container of claim 1, wherein the first of the two layers is a flat layer and the second of the two layers has at least one recess at its side facing the first layer that predefines the course of the fluid channel system.

11. The fluid container of claim 10, wherein the first layer is harder and/or thicker than the second layer.

12. The fluid container of claim 1, wherein the second layer has at least one passage opening in the region between the two weld seams between two channel sections nearest to one another.

13. The fluid container of claim 1, wherein a channel diameter of channel sections in a region that is disposed upstream is smaller than in another region that is disposed downstream.

14. An accumulator device for electrical energy or an electrical consumer having the fluid container of claim 1.

15. The fluid container of claim 6, wherein the reversal region has at least one further channel section that fluidically couples exactly one first channel section with exactly one second channel section and/or at least one further channel section that fluidically couples a plurality of different first channel sections with at least one second channel section or a plurality of second channel sections to at least one first channel section.

16. The fluid container of claim 6, wherein the reversal region has at least two further channel sections that independently of one another fluidically couple at least one respective first channel section with at least one respective second channel section respectively.

17. The fluid container of claim 1, wherein a spacing between the two weld seams is not larger than a widest of the first channel sections that are each nearest neighbors.

* * * * *